United States Patent

Auschra et al.

Patent Number: 6,080,794
Date of Patent: Jun. 27, 2000

[54] DEMULSIFIERS

[75] Inventors: Clemens Auschra, Freiburg; Horst Pennewiss, Darmstadt; Uwe Boehmke, Darmstadt; Michael Neusius, Darmstadt, all of Germany

[73] Assignee: Roehm GmbH, Darmstadt, Germany

[21] Appl. No.: 09/117,455

[22] PCT Filed: Jan. 16, 1997

[86] PCT No.: PCT/EP97/00176

§ 371 Date: Sep. 25, 1998

§ 102(e) Date: Sep. 25, 1998

[87] PCT Pub. No.: WO97/28234

PCT Pub. Date: Aug. 7, 1997

[30] Foreign Application Priority Data

Feb. 2, 1996 [DE] Germany ............... 196 03 696

[51] Int. Cl.[7] .................. B01D 17/05; C08F 220/18; C08F 8/14; C08F 8/00
[52] U.S. Cl. .................. 516/184; 516/189; 508/472; 526/320
[58] Field of Search .................. 516/187, 189, 516/184; 508/472; 526/320

[56] References Cited

U.S. PATENT DOCUMENTS

| | | | |
|---|---|---|---|
| 2,499,369 | 3/1950 | DeGroote et al. | 516/189 |
| 4,582,628 | 4/1986 | Buriks et al. | 516/189 |
| 4,678,599 | 7/1987 | Fock et al. | 526/320 |
| 5,188,770 | 2/1993 | Pennewiss | 508/472 |
| 5,196,486 | 3/1993 | Stephenson | 516/189 |
| 5,661,220 | 8/1997 | Faul et al. | 516/189 |
| 5,691,284 | 11/1997 | Beyer et al. | 508/472 |
| 5,712,359 | 1/1998 | Auschra et al. | 526/329 |
| 5,773,505 | 6/1998 | Pennewiss et al. | 524/505 |

FOREIGN PATENT DOCUMENTS 0 471 266 A1   2/1992   European Pat. Off. .
0 691 355 A2   1/1996   European Pat. Off. .

*Primary Examiner*—Richard D. Lovering
*Assistant Examiner*—Daniel S. Metzmaier
*Attorney, Agent, or Firm*—Oblon, Spivak, McClelland, Maier & Neustadt, P.C.

[57] ABSTRACT

The invention concerns demulsifiers and methods of demulsifying based on polyalkyl (meth)acrylated co-oligomers or copolymers, CNP, built up from the following components consisting essentially of:

A) 10 to less than 60 weight % of alkyl (meth)acrylic acid esters ($CH_2=C(R)C(O)OR_1$), wherein the alkyl group is an optionally branched alkyl group having 1 to 32 carbon atoms;

B) more than 40 to 90 weight % (meth)acrylic acid esters of alkoxylated radicals ($CH_2=C(R)C(O)O(R_A)_n—(R_B)_m—R_2$), wherein $R_2$ has 1 to 50 carbon atoms and is an optionally branched alkyl group, a cycloalkyl group, aryl group, or an alkaryl group; $R_A$ and $R_B$ represent the alkoxylation radicals a) $—CH_2—CH_2—O—$, b) $—CH(CH3)—CH_2—O—$, or c) $—CH_2—CH(CH_3)—O—$; with the proviso n+m is a number between 3 and 200 and any individual member a), b), or c) does not exceed 100; and C) 0 to less than 40 weight % of a 1-alkene with 4 to 32 carbon atoms, with the proviso that the components A)+B)+C) add up to 100 weight %.

8 Claims, No Drawings

DEMULSIFIERS

SPECIFICATION

1. Field of the Invention

The invention relates to demulsifiers on the basis of polyalkyl (meth)acrylate (PAMA) oligomers/polymers.

2. State of the Art

Agents which destroy emulsions are referred to as demulsifiers in the most general sense. Their method of effect is described, for example, in such a way that they change the existing surface film and thereby cause the dispersed phase to flow together (coalescence) (see Winnacker-Kuchler 4th edition, Vol. 7, 95 C. Hanser 1986). Therefore certain surfactant groups are used as demulsifiers because of their surfactant effect, for example block copolymerizates. Technical fields of use for demulsifiers exist, for example, in petroleum processing and in hydraulic fluids (see Ullmann's Encyclopedia of Industrial Chemistry, 5th Ed., Vol. A13, 169, VCH 1989; Surfactants Science Series Vol. 13, K. K. Lissant, ed., Demulsification, M. Dekker 1983).

DE 39 06 702 (Th. Goldschmidt AG) describes polyacrylates which are subsequently modified with alkoxylates. They are used as W/O emulsifiers. Polymethacrylates are not mentioned. Use of the products as demulsifiers is not mentioned.

DE 44 23 358 (Röhm GmbH) describes dispersant PAMA oligomers with alkoxylated methacrylates for the main use of a dispersant additive for lubricant oils, particularly for motor oils, so-called ashless dispersants. Experience has shown that these compounds possess an effect that tends to be harmful to demulsification. From the practice of additive production, it is generally known that contaminants with dispersant additives severely impair the demulsifying effect of hydraulic oils.

Therefore a conclusion concerning demulsifying properties is not possible from the dispersant additives described in DE 44 23 358.

In Houben/Weyl, Vol. I, p. 219 (1958), the general knowledge that practically any emulsifier can also be used as a demulsifier is stated. However, this general knowledge cannot be transferred to the complicated relationships which exist for mineral oils. The number of the compounds to be studied is so large that no general survey is possible, so that no targeted information concerning the solution according to the invention can be derived from the general literature.

Task and Solution

The addition of demulsifiers as additives in hydraulic fluids on a mineral oil basis serves to separate oil and water. The additives used are classified as "ionogenic and non-ionogenic polar compounds" and their effect is described as an interaction with the oil-water boundary.

However, demulsifiers represent only a small part of the additives present in hydraulic fluids, on the average (see Ullmann's Encyclopedia, Vol. A13, loc. cit.). The requirement of rapid separation of the water is particularly urgent for hydraulic fluids.

Because of the complex interplay of the different additive components in the formulations, and because of the partly massive influence of trace contaminants, this requirement is not easy to meet. On the other hand, the use of certain substances of the type of ionogenic and non-ionogenic polar compounds in hydraulic fluids is only possible if the components are sufficiently compatible with one another. Understandably, the incompatibility phenomena are all the less to be expected, the lower the concentration of the individual additives.

PAMA oligomers with alkoxylated methacrylic acid ester radicals, with a dispersant effect, are described in the (non-published) German patent application P 44 23 258.2. There, oligomers with up to 40 wt.-% of alkoxylated comonomer are claimed. For the main area of application described in the German patent application, that of an "ashless dispersant" for motor oils, the preferred compositions are approximately 10–25 wt.-% of alkoxylated comonomer. Use as demulsifiers is not provided in the stated application, and could also not be expected on the basis of these facts.

The present invention is based on the recognition that polyalkyl (meth)acrylate (PAMA) oligomers or polymers with alkoxylated alkyl ester radicals are very well suited as demulsifiers. These (PAMA) oligomers or polymers with alkoxylated alkyl ester radicals are here termed CNP co-oligomers/copolymers.

The class of CNP co-oligomers/copolymers found to be suitable, in the molecular weight range of 1,000 to 300,000 g/mole, are composed of A) 10 to 95, preferably 40 to 70, especially 40 to less than 60 wt.-% (meth)acrylic acid esters of formula I

where R stands for hydrogen or methyl, and $R_1$ stands for an alkyl radical, possibly branched, with 1 to 32 carbon atoms;

B) 5 to 90, preferably 30 to 60, especially more than 40 to 50 wt.-% (meth)acrylic acid esters of formula II

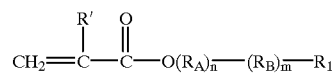

where R' stands for hydrogen or methyl, and where $R_A$ and $R_B$ are selected from the group comprised of

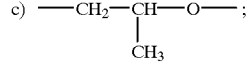

with the proviso that n+m is a number which is at least 3 and up to 200, and that the total of n+m for each individual group member a), b) or c) does not exceed 100. where R' stands for hydrogen or methyl, and $R_1$ stands for an alkyl radical, possibly branched, a cycloalkyl radical, an aryl or an aralkyl radical with 1 to 50, preferably 1–25 carbon atoms, and C) 0 to 40, preferably 0 to less than 20 wt.-% of a 1-alkene with 4 to 32, preferably 4 to 20 carbon atoms.

As new representatives of the polymers covered by CNP, those with proportions of 10 to <60 wt.-% (meth)acrylic acid esters of formula I in A) and accordingly of 90 to >40 wt.-% of the esters of formula II in B) and, if necessary, a complementary content of component C) should be mentioned (CNP' copolymers).

Components A), B) and C) as a rule add up to 100 wt.-%.

If $R_1$ stands for a cycloalkyl radical, this is preferably a 5 to 8 ring, particularly a cyclohexyl radical.

An aryl radical is particularly understood to be a phenyl or naphthyl radical, an aralkyl radical is particularly understood to be a phenalkyl or naphthalkyl radical, which in turn can be alkoxylated.

The CNP Co-oligomers and Copolymers

The molecular weights ($M_w$) of the co-oligomers and copolymers are in the range of 1,000 to 300,000 g/mole, particularly in the range of 3,000 to 30,000 g/mole (determination by gel permeation chromatography, see H. F. Mark et al., Encyclopedia of Polymer Science and Technology, Vol. 10, 1–19, J. Wiley 1987; J. V. Dawkins Comprehensive Polymer Science, Vol. 1, 231 (1989), Pergamon Press).

Possible monomers of formula I are particularly (meth) acrylic acid esters of mixtures of higher alcohols, particularly from the range $C_9$ to $C_{20}$, particularly $C_{10}$ to $C_{18}$ with alternating degrees of branching, in the range of 25 to more than 80%, for example those that occur in large-scale technical production methods such as oxosynthesis.

As examples, the esters of the so-called DOBANOL® alcohols (products of the Shell company), the so-called ALFOL® alcohols (products of the Condea company), the so-called LOROL(® alcohols, the stearic fatty alcohols, and the like.

The esters of alcohol mixtures of isomeric isodecyl alcohols, esters of alcohol mixtures of isomeric isoundecyl alcohols, furthermore esters of an alcohol mixture with an average C number of 13.2 to 13.8 and a predominant content of $C_{12}$–$C_{15}$ alcohols (DOBANOL® 25 L), for example, are of particular interest. As mentioned, the esters of cyclic alcohols, for example with 5 to 8 ring carbon atoms, such as those of cyclopentanol, cyclohexanol, cyclooctanol, benzyl alcohol, alkyl-substituted cyclohexanols such as 4-tert.-butyl cyclohexanol, for example, are well suited for use. The (meth)acrylic acid esters of formula II can be structured of a single group member [A=a], n=3–100, m=0] or of several simultaneously.

Therefore, the (meth)acrylic acid esters of alkoxylated aliphatic alcohols, for example, such as alkoxylated butanol, for example, and other alkoxylated alcohols proceeding from: methanol, ethanol, propanol, pentanol (+isomers), hexanol (+isomers), cyclohexanol, methyl cyclohexanol, 2-ethyl hexanol, and higher aliphatic monovalent alcohols such as isodecyl alcohol, isoundecyl alcohol, isotridecyl alcohol, fatty alcohols produced from natural substances, etc., are possible as compounds of formula II.

Furthermore, the following are possible: alkoxylated phenols, for example based on: phenol, alkyl-substituted phenols, for example t-butyl phenol, 2,6-dimethyl phenol, isomer mixtures of technical alkyl phenols, e.g. octyl phenol, nonyl phenol, dinonyl phenol, naphthol, alkyl-substituted naphthols; furthermore EO/PO addition products to substituted alcohols are possible, for example: furfurol, tetrahydrofurfurol, 2-methoxy butanol, 3-methoxy butanol, 2-dimethylaminoethanol, 2-diethylaminoethanol, 1-dimethylamino-2-propanol, 3-dimethylamino-1-propanol, 2-morpholinoethanol, 2-(2-pyridyl) ethanol, N-(2-hydroxy ethyl) piperidine, N-(2-hydroxy ethyl) pyrrolidine, N-(2-hydroxy ethyl) pyrrolidone.

As is expressed by formula II, mixed EO/PO adducts can be present both in block form and statistically.

For example, alcohols which represent a statistical or block addition product of ethylene oxide and propylene oxide to an alcohol such as butanol, for example, should be mentioned. The range around approximately 2,000 g/mole should be mentioned as a point of departure for the molecular weight of preferred monomers of formula II. However, this does not represent a limitation.

Depending on the degree of alkoxylation (n+m, formula 11), and depending on the size of the radical $R_2$, higher molecular weights up to about 5,000 daltons can also be reached. The monomers of formula II can themselves be present as a mixture comprised of methacrylates of the various alkoxylated alcohols described above.

The monomers of formula III represent the 1-alkenes with 4 to 32 carbon atoms which can be radically polymerized The $C_4$–$C_{16}$ alkenes, for example 1-decene, 1-octene, 1-dodecene, 1-tetradecene, 1-hexadecene, and also 1-octadecene, 1-eicosene, should particularly be mentioned.

Production of the oligomers (CNP) with a demulsifying effect is undertaken according to the rules and experience of radical polymerization (see C. H. Bamford, Encyclopedia of Polymer Sciences, Vol. 13, 708, 2nd ed. (1988)).

Preferably, polymerization takes place in the form of solution polymerization in a suitable organic solvent L. The solvent L can accordingly be:

a) an inert solvent with a high boiling point, such as decahydronaphthaline (Decalin®, b.p.>180° C.), dodecyl benzene (b.p>275° C.), tert.-butyl benzene (b.p.=169° C.), dodecane (b.p.=216° C.). Ester oils such as di-2-ethylhexyl adipate (Vestinol OA, Hüls), mineral oils such as Shell SM 920, oils high in aromatics such as Shellsol AB, or b) advantageously solvents which are known to possess an effect that regulates the molecular weight in radical polymerization, such as 1,2,3,4-tetrahydronaphthaline (tetraline, b.p.=207° C.), cyclooctene (b.p.=144° C.), technical dipentene (mixture of terpene hydrocarbons, b.p.>170° C.), or solvent mixtures of the components listed under a) and b), or c) advantageously, instead of the organic solvent L, the product itself (i.e. CNP) or another CNP' with a different chemical composition or a different molecular weight can be used. In this case, it is not necessary to distill the solvent L off, for one thing, and mixtures of demulsifying oligomers with supplemental effect can be produced directly, for another thing.

Initiators which can be used are known, particularly organic radical initiators IN, preferably with a decomposition temperature under standardized half-life conditions in the range of 90–130° C. (see H. Logemann in Houben-Weyl, Methoden der Organ. Chemie/Methods of Organic Chemistry/, 4th ed., Vol. XIV/I, p. 248, Georg Thieme (1961); Brandrup-Immergut, Polymer Handbook 3rd ed., II-1, J. Wiley 1989), for example from the group of organic peroxy compounds, particularly with tertiary alkyl radicals, for example 2,2-bis-(tert.-butyl-peroxy) butane, tert.-butyl perbenzoate, di-tert.-butyl peroxide, cumol hydroperoxide, and the like.

As a rule, the initiators are added in amounts of approximately 0.01 to 3 wt.-% with reference to the monomers. The polymerization temperatures are generally above 90° C. and up to approximately 160° C., advantageous approximately 110° C.

It is furthermore advantageous to also use common regulators for radical polymerization, particularly sulfur regulators such as dodecyl mercaptan in proportions of 0 to 4% with reference to the total amount of monomer used.

Individually, the method of procedure can be such that in a suitable reactor, for example a three-neck flask equipped with a gas inlet, stirring devices, distillation set-up, and thermometer, and under a protective gas such as nitrogen, the solvent L, which has been pre-heated to polymerization temperature, for example to 110° C., and part of the monomer mixture, are presented, and that the remaining monomer mixture is continuously metered in, together with the initiator, over a specific period of time, for example over 3.5 hours. After the end of the run-in period, and at polymerization temperature, for example 110° C., initiator is metered in once or twice. After the reaction mixture has been kept at a temperature of 110° C. for another 4 Hours, the production process is complete. Clear solutions of the oligomers in the solvent L are formed.

Advantageous Effects

The CNP co-oligomers and copolymers according to the invention possess an excellent effect as demulsifiers, particularly in the sector of lubricants. While additive amounts in the range of approximately 0.5–8 wt.-% of CNP co-oligomers/copolymers are typical in the area of use as "ashless dispersants" in motor oils, the usage concentrations as demulsifiers are much lower, typically in the range of 50–1,000 ppm with reference to the formulation.

In the main area of use of "ashless dispersants" for motor oils (as described in P 44 23 358.2), the technically most interesting compositions of the co-oligomers/copolymers are at 10–25 wt.-% of alkoxylated comonomer (compounds of formula 11). In the use according to the invention, as demulsifiers, the best efficacy is achieved, according to available results, at higher proportions of alkoxylated comonomers, i.e. at 30–60 wt.-%, particularly at a proportion of 40–50 wt.-%.

The demulsifiers according to the invention demonstrate an unexpectedly good effect even at the stated, very low usage concentrations. Their good compatibility with other additive components in the lubricants should also be emphasized.

It is particularly recommended to add the new demulsifiers, as internal ancillary substances, to various additives which are usually used, such as VI improvers and flow point improvers (PPD).

Furthermore, there is the possibility of adding such demulsifiers to the DI packages of commerce or to the basic oils themselves, or also of using them as a separate additive in the production of lubricant oil or hydraulic oil formulations. According to experience gained until now, for example in hydraulic formulations, there is no impairment of other properties which are significant for technical applications, in formulations with such additives.

It can therefore be expected that the CNP oligomers/polymers according to the invention will prove to be useful over the entire spectrum of the areas of use for demulsifiers, e.g. also as splitters in petroleum transport.

The following examples serve to explain the invention. The determination of the actual viscosity KV is made according to ASTM D 445, the determination of the specific viscosity $\eta_{spez/c}$ according to DIN 51562.

The demulsification capacity is defined by ASTM D 1401.

EXAMPLES

Materials:
Ester I-A: methacrylate of alcohol Dobanol® 25 L (Shell company, mixture of C11 to C16 alcohols)
Ester II-A: methacrylate of ethoxylated tridecyl alcohol with degree of ethoxylation of 20
Ester II-B: methacrylate of ethoxylated nonyl phenol with degree of ethoxylation of 10
Ester I-B: butyl methacrylate
Ester I-C: methyl methacrylate
Initiator A: tert.-butyl per-2-ethyl hexanoate)
Initiator B: 2,2-bis-(tert.-butyl peroxy) butane 50% in aliphates Shellsol®AB: oil rich in aromatics (product of Shell)
Vestinol®OA: ester oil di-2-ethylhexyl adipate (product of Hüls AG) 1-decene tetraline Examples 1 to 4

General method of procedure for the production of 50% CNP PAMA oligomers in mineral oil or synthetic oils (PAO, ester oil) as run-in polymerization: In a polymerization apparatus comprised of a three-neck flask with oil bath heating, sable stirrer, inside thermometer, $N_2$ bridging and reflux cooler, the following are presented:

| | |
|---|---|
| 125 g | solvent |
| 13.89 g | monomer mixture |
| 0.56 g | dodecyl mercaptan (regulator) | and heated to the polymerization temperature of 110° C. After addition of 0.15 g Initiator A, a mixture consisting of:

| | |
|---|---|
| 111.11 g | monomer mixture |
| 4.44 g | dodecyl mercaptan |
| 2.22 g | Initiator A | is continuously pumped in within 3.5 h within 3.5 h. 2 h and 4 h after the end of run-in, 0.25 g dodecyl mercaptan and 1.25 g Initiator A are added, in each instance, and then the mixture is kept at polymerization temperature for another 4 h. Yield: 250 g of 50% CNP PAMA oligomers as clear solutions.

By varying the composition of the monomer mixture as indicated in column 2 of Table 1, the 50% PMMA oligomers Example 1 to Example 4 were produced.

Example 5

Production of a 100% oligomer in tetraline/decene mixture:

In an apparatus as in Example 1, 133.3 g tetraline are presented and heated to 140° C. under $N_2$.

Within 5 h, a hot mixture of

| | |
|---|---|
| 75.0 g | Ester I-A |
| 66.7 g | Ester II-B |
| 58.4 g | decene |
| 2.0 g | Initiator B | is continuously pumped in. 30 min after the end of run-in, 0.25 ml Initiator B are added 12 times, at intervals of 30 min in each instance. 60 min after the last addition, the tetraline and the non-reacted decene are distilled off in a vacuum, up to a sump temperature of 162° C. Yield: 155 g CNP oligomer with the composition as indicated in Table 1.

Actual viscosity: KV (100° C.)=45,25 $mm^2/s$, KV (40° C.)=262 $mm^2/s$

Table 1 presents the composition of the oligomers as well as the specific viscosity $\eta_{sp/c}$ as a measure of the molecular weight.

| Example | Composition of the monomer mixture, i.e. of the oligomer [wt.-%] | Polymerization temperature [° C.] | Solvent for production | Concentration of the additive [%] | $\eta_{sp/c}$ in CHCl$_3$ at 25° C. [ml/g] |
|---|---|---|---|---|---|
| 1 | Ester I-B - Ester II-A 60-40 | 110 | Shellsol AB | 50 | 11.6 |
| 2 | Ester I-B - Ester II-A 50-50 | 110 | Shellsol AB | 50 | 12.6 |
| 3 | Ester I-B - Ester II-A 50-50 | 110 | Vestinol OA | 50 | 15.4 |
| 4 | Ester I-C - Ester I-A ESTER II-A 26.7 - 23.3 - 50 | 95 | Vestinol OA | 50 | 16.3 |
| 5 | Ester I-A - Ester II-B Decene 49.5 - 44.0 - 6.5 *) | 140 | tetraline/ decene | 100 | |

* the indicated composition is the composition of the 100% end product.

The efficacy of the new demulsifiers is demonstrated using the demulsification test according to ASTM D 1401 on model formulations of VI improvers in 150 N oil.
Composition of the basic formulations A, B, and C (wt.-%):

| | |
|---|---|
| 90% | 150 N oil |
| 10% | PMMA VI improver I (molecular weight = 100,000) |

The basic formulations A, B, and C were mixed with different batches of 150 N oil and VI improver. The three basic formulations do not fulfill the demulsification requirements according to ASTM 1401 (see Table 2).

TABLE 2

| Demulsifier | Addition of demulsifier (with reference to the basic formulation) [ppm] | Demulsification #) ASTM D 1401 [oil/water/emulsion/time] [ml/ml/ml/min] |
|---|---|---|
| Basic formulation A: | | |
| — | 0 | 2/0/78/30' |
| Example 1 | 200 | 42/38/0/15' |
| Example 2 | 200 | 41/39/0/15' |
| Basic formulation B: | | |
| — | 0 | 2/3/75/30' |
| Example 3 | 200 | 41/39/0/10' |
| Example 4 | 200 | 41/39/0/15' |
| Basic formulation C: | | |
| — | 0 | 3/7/70/30' |
| Example 5 | 200 | 41/39/0 25' |

) The test is passed if the emulsion separates in ≦30', i.e. if less than 3 ml residual emulsion remain.

Table 2 shows that by adding 200 ppm of the CNP oligomers to various basic formulations which demulsify poorly, the demulsification test is passed in every instance.

Composition of the full ISO HV46 hydraulic oil formulation D:

| | |
|---|---|
| 30.0% | 90 N oil |
| 59.9% | 150 N oil |
| 9.4% | PMMA VI improver I (molecular weight = 160,000) |
| 0.7% | hydraulic DI package |

The hydraulic oil formulation does not fulfill the demulsification requirements according to ASTM 1401.

TABLE 3

| Demulsifier | Addition of demulsifier (with reference to the basic formulation) [ppm] | Demulsification #) ASTM D 1401 [oil/water/emulsion/time] [ml/ml/ml/min] |
|---|---|---|
| Formulation D: | | |
| — | 0 | 36/6/38/30' |
| Example 3 | 200 | 40/40/0 10' |
| Example 4 | 200 | 40/40/0/15' |

Table 3 shows that even in a complex system of a full hydraulic oil formulation, the CNP oligomers have a good effect.

What is claimed is:

1. A method for demulsifying an oil/water emulsion which comprises adding to the emulsion an effective amount of from 50 to 1,000 ppm of the emulsion of a demulsifier which is a polyalkyl (meth)acrylate co-oligomer or copolymer consisting essentially of a co-oligomer or copolymer of A) 10 to less than 60 wt. % of a (meth)acrylic acid ester of formula I

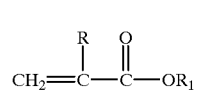

(I)

where R' stands for hydrogen or methyl, and
R$_1$ stands for an alkyl radical, possibly branched, with 1 to 32 carbon atoms, B) more than 40 to 90 wt. % of a (meth)acrylic acid ester of formula II

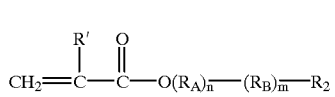

(II)

where R' stands for hydrogen or methyl, and
where R$_A$ and R$_B$ are selected from the group consisting of

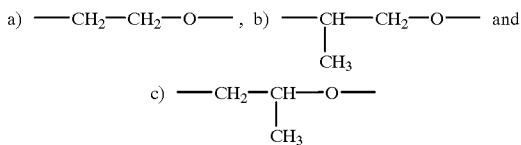

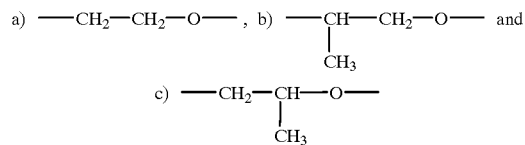

with the proviso that n+m is a number from 3 to 200, and that the total of n+m for each individual group member a), b) or c) does not exceed the number 100
and $R_2$ stands for an alkyl radical, possibly branched, a cycloalkyl radical, an aryl radical or an aralkyl radical with 1 to 50 carbon atoms, C) 0–40 wt. % of a 1-alkene with 4 to 32 carbon atoms.

2. A polyalkyl(meth)acrylate co-oligomer or copolymer consisting essentially of a co-oligomer or copolymer of A) 10 to less than 60 wt. % of a (meth)acrylic acid ester of formula I

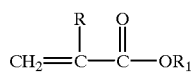

where R stands for hydrogen or methyl, and $R_1$ stands for an alkyl radical, possibly branched, with 1 to 32 carbon atoms, B) more than 40 to 90 wt. % of a (meth)acrylic acid ester of formula II

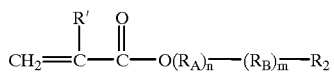

where R' stands for hydrogen or methyl, and
where $R_A$ and $R_B$ are selected from the group consisting of with the proviso that n+m is a number from 3 to 200, and that the total of n+m for each individual group member a), b) or c) does not exceed the number 100
and $R_2$ stands for an alkyl radical, possibly branched, a cycloalkyl radical, an aryl radical or an aralkyl radical with 1 to 50 carbon atoms, C) 0 to less than 20 wt. % of a 1-alkene with 4 to 32 carbon atoms, with the proviso that the components A)+B)+C) add up to 100 wt. %.

3. Co-oligomers or copolymers according to claim 2 having a molecular weight of 1,000 to 300,000.

4. A method for demulsifying an oil/water emulsion comprising adding to the emulsion a demulsifying effective amount of the co-oligomer or copolymer of claim 3.

5. The method of claim 4 where the demulsifying effective amount is 50–1,000 ppm of the emulsion.

6. Polyalkyl (meth)acrylate co-oligomer or copolymer according to claim 6 consisting essentially of a co-oligomer or copolymer of A) 50 wt. % butyl methacrylate, and B) 50 wt. % of a methacrylate of ethoxylated tridicylalcohol with a degree of ethoxylation of 20.

7. A method for demulsifying a motor oil/water emulsion comprising adding to the emulsion a demulsifying effective amount of the co-oligomer or copolymer of claim 6.

8. A method for demulsifying a hydraulic oil/water emulsion which comprises adding to the emulsion an effective amount of the co-oligomer or copolymer of claim 6.

* * * * *